US008814140B2

(12) United States Patent
Karl et al.

(10) Patent No.: US 8,814,140 B2
(45) Date of Patent: Aug. 26, 2014

(54) VALVE FOR CONTROLLING A FLUID

(75) Inventors: Andreas Karl, Benningen/Neckar (DE);
Andreas Lechler, Vaihingen/Enz (DE);
Jens Norberg, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 13/369,535

(22) Filed: Feb. 9, 2012

(65) Prior Publication Data

US 2012/0211691 A1 Aug. 23, 2012

(30) Foreign Application Priority Data

Feb. 10, 2011 (DE) .......................... 10 2011 003 926

(51) Int. Cl.
*F16K 1/00* (2006.01)
*F16K 15/00* (2006.01)
*F16K 47/00* (2006.01)
*F16L 55/02* (2006.01)

(52) U.S. Cl.
USPC .......................................... 251/333; 251/122

(58) Field of Classification Search
CPC ........ F02M 61/18; F02M 61/188; F16K 1/42; F16K 1/38; B60T 8/363
USPC .......................................... 251/333, 120–122
See application file for complete search history.

(56) References Cited

U.S. PATENT DOCUMENTS

| 4,688,755 | A | * | 8/1987 | Pluviose | 251/121 |
| 5,570,843 | A | * | 11/1996 | Heyse et al. | 239/585.1 |
| 5,662,277 | A | * | 9/1997 | Taubitz et al. | 239/585.4 |
| 6,070,812 | A | * | 6/2000 | Tani et al. | 239/533.12 |
| 6,257,506 | B1 | * | 7/2001 | Hofmann et al. | 239/533.2 |
| 6,357,676 | B1 | * | 3/2002 | Hanft | 239/585.1 |
| 6,375,154 | B1 | * | 4/2002 | Kussel et al. | 251/210 |
| 6,631,854 | B1 | * | 10/2003 | Stier | 239/102.1 |
| 7,000,856 | B2 | * | 2/2006 | Mattes et al. | 239/533.12 |
| 7,086,615 | B2 | * | 8/2006 | Joseph | 239/596 |
| 2003/0197140 | A1 | * | 10/2003 | Green | 251/121 |

* cited by examiner

*Primary Examiner* — Elizabeth Houston
*Assistant Examiner* — Michael R Reid
(74) *Attorney, Agent, or Firm* — Maginot, Moore & Beck

(57) ABSTRACT

A valve for controlling a fluid includes a closing body and a valve seat. The closing body opens and closes a passage at the valve seat along a sealing line. The valve seat and the closing body have a rotationally symmetrical region where the sealing line between the valve seat and closing body is formed. The valve seat and/or the closing body also has a nonrotationally symmetrical region, which adjoins the rotationally symmetrical region in a throughflow direction of the valve.

11 Claims, 3 Drawing Sheets

VALVE FOR CONTROLLING A FLUID

This application claims priority under 35 U.S.C. §119 to German patent application no. 10 2011 003 926.0, filed on Feb. 10, 2011 in Germany, the disclosure of which is incorporated herein by reference in its entirety.

BACKGROUND

The present disclosure relates to a valve for controlling a fluid by means of a transverse force applied in a directed manner to a closing body.

Valves for controlling a fluid are known in various embodiments from the prior art and, in particular, are used, for example, as inlet valves for antilock devices (ABS devices) in motor vehicles. In these valves, however, depending on the operating conditions, vibrations arise on the closing body which, in the case of pronounced deflection about the centric position, may knock against the symmetrically designed valve seat and damage this.

SUMMARY

By contrast, the advantage of the magnet valve according to the disclosure for controlling a fluid, is that, by virtue of a nonsymmetrical geometric configuration of the valve seat and/or of the closing body, a nonsymmetrical fluid flow with decentering hydraulic forces is generated, which prevents the closing body from knocking against the valve seat. This is achieved, according to the disclosure, in that the valve comprises a valve seat and a closing body which opens and closes a passage at the valve seat along a sealing line. The valve seat and the closing body have a rotationally symmetrical region where the sealing line between the valve seat and closing body is formed. Furthermore, the valve seat and/or the closing body have/has a nonrotationally symmetrical region which directly adjoins the rotationally symmetrical region in the throughflow direction of the valve. As a result, during a stroke of the closing body, a defined flow topology can be formed, with nonsymmetrical hydraulic forces which eccentrically open the closing body in a directed manner during the opening action and thereby prevent knocking against the valve seat. The valve can preferably be used as a regulating valve/inlet valve in antilock devices (ABS devices).

According to a preferred refinement of the disclosure, the rotationally symmetrical region of the valve seat is of completely conical design. This ensures operationally reliable closing and dependable leaktightness of the valve.

Preferably, the nonrotationally symmetrical region of the valve seat has a first, circular subregion and a second, elliptical subregion. Furthermore, the second, elliptical subregion preferably forms half of the nonrotationally symmetrical region. As a result of the nonsymmetrical shape, the fluid is conducted through the released annular cross section of the valve in a different preferential direction, and, with the closing body open a fluid flow with low velocity and with higher pressure, as compared with those in the first, circular subregion, is generated in the second, elliptic subregion. This results in a decentering force which acts on the closing body and guides this into an eccentric position, with the result that knocking against the valve seat is prevented in all stroke ranges.

In a further advantageous refinement of the disclosure, the nonrotationally symmetrical region is designed in such a way that a pressure rise at the nonrotationally symmetrical region is twice as high as at the rotationally symmetrical region. This results in a sufficiently high decentering force which also effectively suppresses a tendency of the closing body to vibration under critical operating conditions. If the decentering hydraulic forces are correspondingly high, the closing body is pressed along on the valve seat and is in contact with the valve seat, so that vibrations and therefore knocking of the closing body against the valve seat can be reliably prevented.

According to a preferred refinement of the disclosure, the rotationally symmetrical region is formed on the valve seat and the nonrotationally symmetrical region is formed on the closing body. This makes it possible to produce the valve seat efficiently in terms of time and of cost. Moreover, conventional valves can be converted efficiently in terms of time and of cost by exchanging the closing body.

Preferably, furthermore, the nonrotationally symmetrical region is formed on the valve seat and the rotationally symmetrical region is formed on the closing body. In this case, existing closing body components can be used further in a cost-efficient way.

Preferably, a nonrotationally symmetrical region is formed on the valve seat and on the closing body. As a result, a further-increased pressure rise can be generated in the fluid flow, and therefore a higher decentering force can be generated which reduces the load upon the closing body during operation and prolongs service life.

According to a preferred refinement of the disclosure, a transitional edge is formed at the transition between the rotationally symmetrical region and the nonrotationally symmetrical region. An immediately commencing pressure rise or an abruptly falling velocity of the fluid flow is thereby achieved.

BRIEF DESCRIPTION OF THE DRAWINGS

Exemplary embodiments of the disclosure are described in detail below, with reference to the accompanying drawing in which.

DETAILED DESCRIPTION

A valve 1 for controlling a fluid is described in detail below in a first preferred exemplary embodiment of the disclosure with reference to FIGS. 1 to 3.

Figure 1:
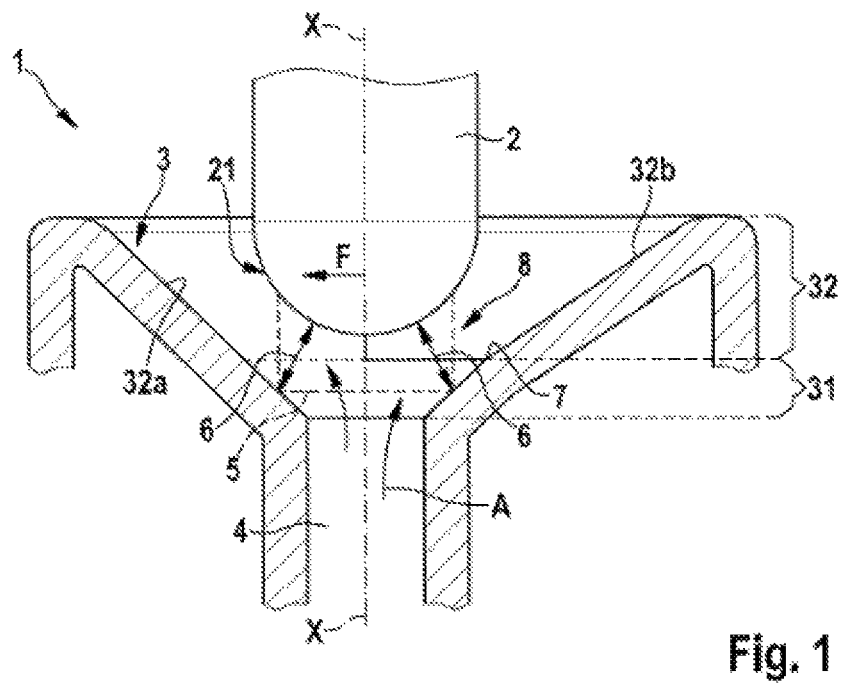
FIG. 1 shows a diagrammatic sectional illustration of the valve according to the disclosure in a first exemplary embodiment of the disclosure.
Figure 2:
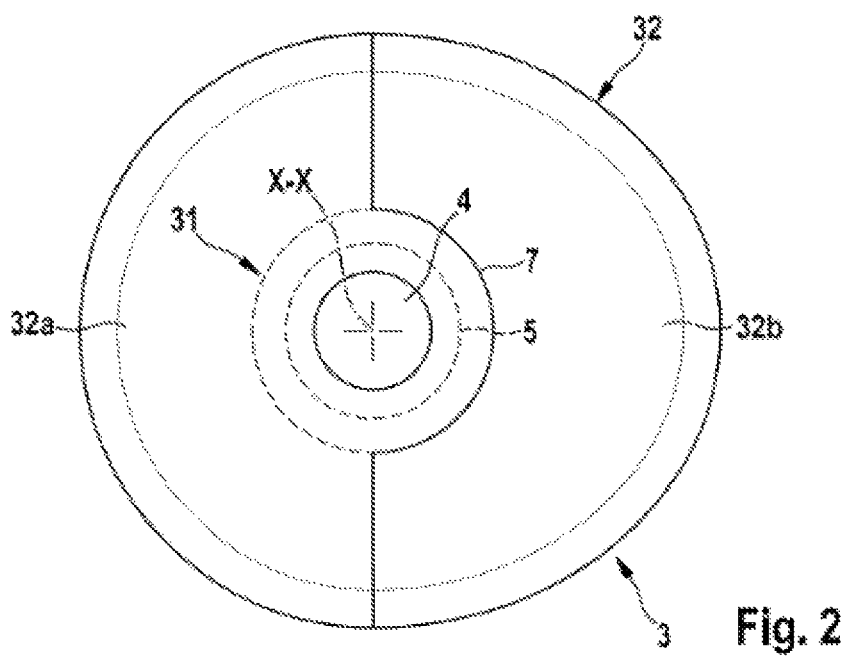
FIG. 2 shows a top view of the valve seat of the valve of FIG. 1.

FIG. 1 shows the valve 1, comprising a valve seat 3 and a closing body 2 which releases and closes a passage 4 and a valve seat 3 along a sealing line 5. The closing body 2 has a cylindrical shape with a hemispherically designed rotationally symmetrical region 21. The valve seat 3 has a rotationally symmetrical region 31 where the circular sealing line 5 between the valve seat 3 and the closing body 2 is formed. FIG. 1 shows the valve 1 in the completely open stroke position, in which a fluid is supplied at high pressure in the direction of an axis X-X and, in a throughflow direction A indicated by arrows, is deflected at the closing body 2 into a released annular cross section 8 between the closing body 2 and the valve seat 3.

Furthermore, the valve seat 3 has a nonrotationally symmetrical region 32 which adjoins the rotationally symmetrical region 31 at a transitional edge 7 in the throughflow direction A. As is clear from FIG. 2, the nonrotationally symmetrical region 32 has a first, circular subregion 32a forming one half and a second, elliptical subregion 32b forming the other half of the nonrotationally symmetrical region 32. The first and second subregions 32a, 32b are also separated from one another in the circumferential direction by the transitional edge 7.

As is also clear from FIG. 1, with the valve 1 open, a minimum cross section 6 for the fluid flow is formed between the valve seat 3 and the closing body 2 at the position of the sealing line 5. The fluid flow has maximum velocity at the minimum cross section 6. As is clear from FIG. 3, a static pressure P of the fluid flow therefore reaches a minimum at the minimum cross section 6. At the transitional edge 7, the fluid flow enters the nonrotationally symmetrical second subregion 32b on one half of the valve seat 3. Since the annular cross section 8 widens from the transitional edge 7, the velocity of the fluid flow falls sharply. Consequently, the pressure P of the second subregion 32b rises on one side earlier than at the opposite first subregion 32a which has a comparatively flat pressure rise (see FIG. 3). This gives rise to an imbalance of forces with a resulting transverse force fraction in the form of a decentering force F which is effective on the closing body 2 transversely to the stroke direction of the valve 1 along the axis X-X and which presses the closing body 2 toward the side of lower pressure, that is to say toward that of the first subregion 32a (see FIG. 1).

Figure 3:
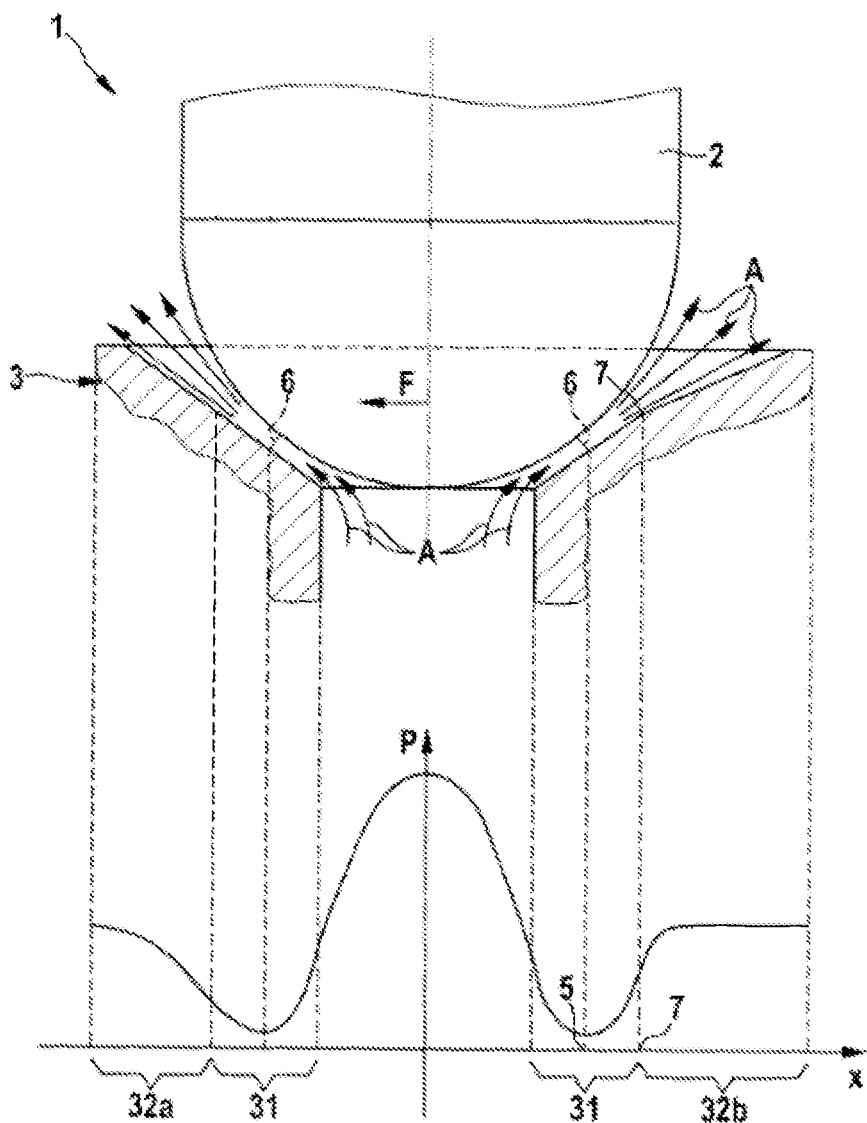
FIG. 3 shows a diagrammatic view of a sectional illustration of the valve according to the disclosure from FIG. 1, with an illustration of the pressure conditions.

As illustrated in FIG. 3 this shows the valve in the partially open state, the decentering force F is effective even in the case of small strokes of the closing body 2. Furthermore, the nonrotationally symmetrical second subregion 32b is preferably designed such that the pressure rise brought about therein is preferably twice as high as in the rotationally symmetrical first subregion 32a. It is thereby possible to suppress effectively the tendency of the valve 1 to vibrate or the knocking of the closing body 2 independently of each degree of opening and to avoid damaging it.

Figure 4:
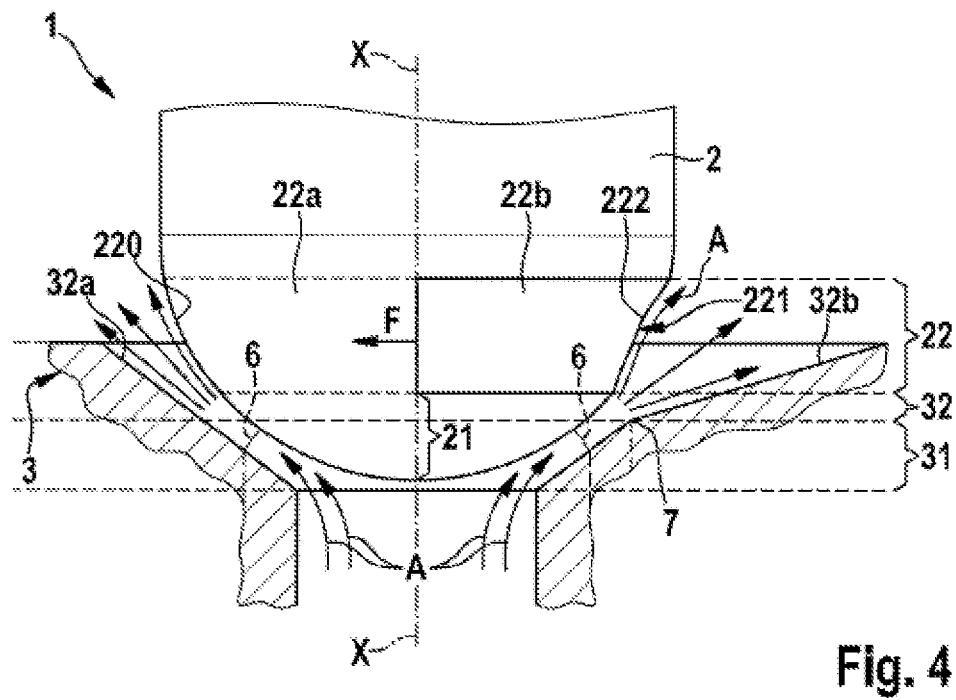
FIG. 4 shows a diagrammatic sectional illustration of the valve according to a second exemplary embodiment of the disclosure.

A valve 1 according to a second exemplary embodiment of the disclosure is described in detail below with reference to FIG. 4. Identical or functionally identical components are designated here by the same reference symbols as in the first exemplary embodiment.

In contrast to the above-described first exemplary embodiment, in this case a nonrotationally symmetrical region 32 with a first subregion 22a and a second subregion 22b is also formed on the closing body 2 in addition to the nonrotationally symmetrical region 32 on the valve seat 3. The first and second subregions 22a, 22b in this case form part of the surface of the closing body 2, the first subregion 22a having a surface 220 in the form of a subsection of a sphere, while the second subregion 22b has a surface 221 with a recess 222. The second subregion 22b is in this case arranged opposite the second subregion 32b. As a result, in comparison with the first exemplary embodiment, a substantially larger cross-sectional widening and therefore a greater rise in the pressure P are achieved, with the result that the action of the decentering force F commences in a markedly more pronounced way even in the case of a minimum stroke of the closing body 2.

Figure 5:
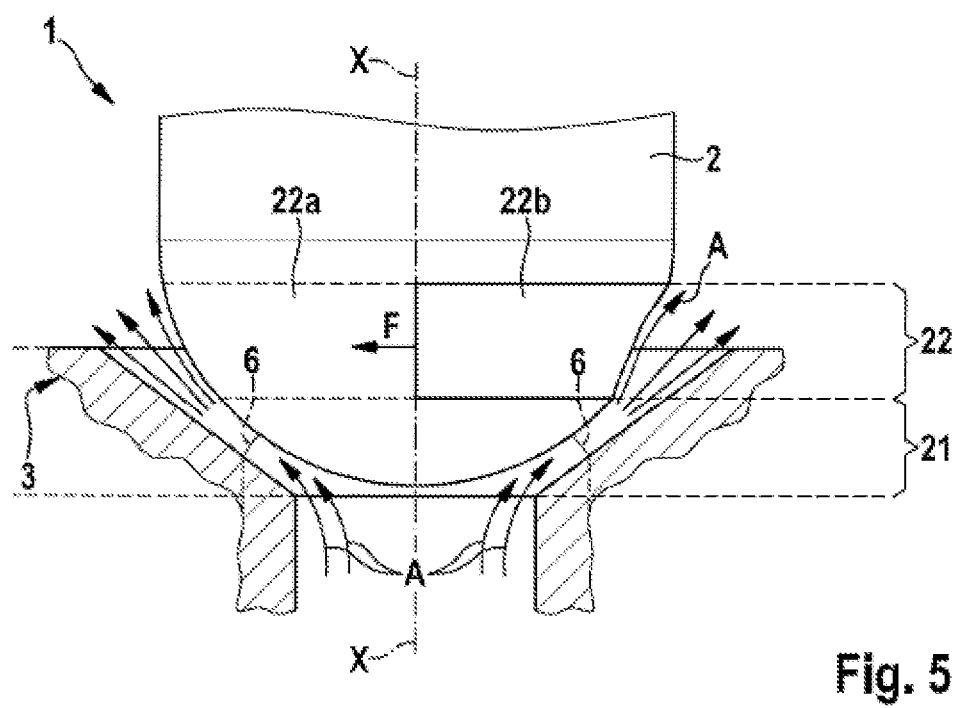
FIG. 5 shows a diagrammatic sectional illustration of the valve according to a third exemplary embodiment of the disclosure.

A valve 1 according to a third exemplary embodiment of the disclosure is described in detail below with reference to FIG. 5. Identical or functionally identical components are designated here by the same reference symbols as in the first and second exemplary embodiments. In contrast to the first exemplary embodiment, in this case the closing body 2 has a nonrotationally symmetrical region 22, while the valve seat 3 is of a completely rotationally symmetrical form. The same advantages and effects as in the first exemplary embodiment can thereby be achieved. Moreover, existing valve construction series can be converted in a simple way merely by exchanging the closing body 2.

The valve 1 according to the disclosure of the above-described exemplary embodiments therefore has the advantage that, by virtue of the geometric shape or external configuration of the valve seat 3 and/or of the closing body 2, a non-symmetrical fluid flow with a decentering force F resulting from this and acting in a directed manner upon the closing body 2 is generated. As a result, the closing body 2 is opened eccentrically, so that vibrations and consequently knocking of the closing body 2 are effectively suppressed. The load upon the closing body 2 and the risk of damage to the surface of the closing body 2 can thus be reduced considerably.

What is claimed is:

1. A valve for controlling a fluid comprising:
   a valve seat; and
   a closing body configured to open and close a passage at the valve seat along a sealing line,
   wherein the valve seat and the closing body have a rotationally symmetrical region where the sealing line between the valve seat and closing body is formed, and
   wherein the valve seat and/or the closing body have a nonrotationally symmetrical region which adjoins the rotationally symmetrical region in a throughflow direction of the valve, and
   wherein the nonrotationally symmetrical region of the valve seat has a first, circular subregion and a second, elliptical subregion.

2. The valve according to claim 1, wherein the rotationally symmetrical region of the valve seat is of completely conical design.

3. The valve according to claim 1, wherein the second, elliptical subregion forms half of the nonrotationally symmetrical region.

4. The valve according to claim 1, wherein the rotationally symmetrical region is formed on the valve seat and the nonrotationally symmetrical region is formed on the closing body.

5. The valve according to claim 1, wherein the nonrotationally symmetrical region is formed on the valve seat and the rotationally symmetrical region is formed on the closing body.

6. The valve according to claim 1, wherein a nonrotationally symmetrical region is formed on the valve seat and a nonrotationally symmetrical region is formed on the closing body.

7. The valve according to claim 1, wherein a transitional edge is formed at the transition between the rotationally symmetrical region and the nonrotationally symmetrical region.

8. The valve according to claim 1, wherein the nonrotationally symmetrical region is configured to increase a spacing between the valve seat and the closing body to thereby increase a static pressure at the spacing.

9. The valve according to claim 8, wherein:
   a first pressure rise is formed at the spacing at the rotationally symmetrical region and a second pressure rise is formed at the spacing at the nonrotationally symmetrical region, the second pressure rise at the nonrotationally symmetrical region being twice as high as the first pressure rise at the rotationally symmetrical region.

10. A valve for controlling a fluid comprising:
a valve seat; and
a closing body configured to open and close a passage at the valve seat along a sealing line,
wherein the valve seat and the closing body have a rotationally symmetrical region where the sealing line between the valve seat and closing body is formed,
wherein the valve seat and/or the closing body have a nonrotationally symmetrical region which adjoins the rotationally symmetrical region in a throughflow direction of the valve,
wherein the nonrotationally symmetrical region is configured to increase a spacing between the valve seat and the closing body to thereby increase a static pressure at the spacing,
wherein a first pressure rise is formed at the spacing at the rotationally symmetrical region and a second pressure rise is formed at the spacing at the nonrotationally symmetrical region, and
wherein the second pressure rise is greater than the first pressure rise and moves the closing body transversely relative to the valve seat,
wherein the nonrotationally symmetrical region of the valve seat has a first, circular subregion and a second, elliptical subregion.

11. The valve according to claim 10, wherein the second, elliptical subregion forms half of the nonrotationally symmetrical region.

* * * * *